United States Patent [19]

Smutny

[11] Patent Number: 4,954,552

[45] Date of Patent: Sep. 4, 1990

[54] STABILIZED CARBON MONOXIDE-OLEFIN COPOLYMER COMPOSITIONS

[75] Inventor: Edgar J. Smutny, Houston, Tex.

[73] Assignee: Shell Oil Company, Houston, Tex.

[21] Appl. No.: 351,510

[22] Filed: May 15, 1989

[51] Int. Cl.$^5$ ............................................. C08K 5/07
[52] U.S. Cl. ..................................... 524/356; 524/357
[58] Field of Search ............... 524/356, 361; 528/392; 523/125, 126

[56] References Cited

U.S. PATENT DOCUMENTS

| | | | |
|---|---|---|---|
| 2,985,617 | 5/1961 | Salyer et al. | 524/399 |
| 3,248,378 | 4/1966 | Behrenbruch et al. | 524/357 |
| 3,474,464 | 10/1969 | Matthews et al. | 524/357 |
| 3,676,401 | 7/1972 | Henry | 523/126 |
| 3,694,412 | 9/1972 | Nozaki | 260/63 CQ |
| 3,753,952 | 8/1973 | Guillet | 523/125 |
| 4,221,687 | 9/1980 | Minagawa et al. | 524/357 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

OTHER PUBLICATIONS

Gerald Scott: *Developments in Polymer Stabilization-5*, 71–85 (1982).

*Primary Examiner*—Veronica P. Hoke

[57] ABSTRACT

Linear alternating polymers of carbon monoxide and at least one ethylenically unsaturated hydrocarbon are provided melt stability by the inclusion therein of barium acetylacetonate or titanium acetylacetonate.

14 Claims, No Drawings

STABILIZED CARBON MONOXIDE-OLEFIN COPOLYMER COMPOSITIONS

FIELD OF THE INVENTION

This invention relates to stabilized compositions comprising linear alternating polymers of carbon monoxide and at least one ethylenically unsaturated hydrocarbon. More particularly, the present invention relates to compositions comprising such polymers stabilized against loss of crystallinity by the inclusion therein of barium or titanium acetylacetonates.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent general processes for the production of the linear alternating polymers are illustrated by a number of published European Patent Applications including 121,965, 181,014, 213,671 and 257,663. The process usually involves the use of a catalyst formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting materials are relatively high molecular weight materials having established utility as premium thermoplastics in the production of shaped articles such as containers for food and drink by procedures which are conventionally employed with thermoplastics. Although the linear alternating polymers are crystalline with well defined melting points, the polymers do tend to lose crystallinity to some extent when exposed to multiple melting/solidification cycles. This apparent loss of crystallinity results in decreases in certain of the desirable properties of the polymers. It would be of advantage to provide compositions of the linear alternating polymers which have been stabilized against such loss of crystallinity, i.e., which have a higher melt stability.

SUMMARY OF THE INVENTION

This invention provides compositions of a linear alternating polymer of carbon monoxide and at least one ethylenically unsaturated hydrocarbon which are stabilized against undue loss of crystallinity upon repeated melting/crystallization cycles. More particularly the invention provides such compositions which are stabilized against undue loss of crystallinity by the inclusion therein of barium or titanium acetylacetonate.

DESCRIPTION OF THE INVENTION

The polymers which are stabilized according to the invention are the linear alternating polymers of carbon monoxide and at least one ethylenically unsaturated hydrocarbon which are known as polyketones or polyketone polymers. The ethylenically unsaturated hydrocarbons which are useful as the precursors of the polyketone polymers have up to 20 carbon atoms inclusive, preferably up to 10 carbon atoms inclusive, and are aliphatic including ethylene and other alpha-olefins such as propylene, 1-butene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbon are styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, especially an alpha-olefin such as propylene.

When the preferred terpolymers are employed in the compositions of the invention, there will be at least about 2 units incorporating a moiety of ethylene for each unit incorporating a moiety of the second hydrocarbon. Preferably there will be from about 10 units to about 100 units incorporating a moiety of ethylene per unit incorporating a moiety of the second hydrocarbon. The polymer chain of the preferred polymers is therefore represented by the formula

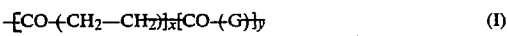

$$-[CO-(CH_2-CH_2)]_x-[CO-(G)]_y- \quad (I)$$

wherein G is a moiety of the second hydrocarbon polymerized through the ethylenic unsaturation. The $-CO-(CH_2-CH_2)-$ units and the $-CO-(G)-$ units are formed randomly throughout the polymer chain and the ratio of y:x is no more than about 0.5. In the modification of the invention where copolymers of carbon monoxide and ethylene are employed without the presence of second hydrocarbon, the polymers are represented by the above formula I wherein y is O. When y is other than O, i.e., terpolymers are employed, ratios of y:x from about 0.01 to about 0.1 are preferred. The end groups or "caps" of the polymer will depend upon what materials were present during the production of the polymer and how or whether the polymer has been purified. The end groups are of little significance so far as the overall properties of the polymer are concerned so that the polymer is fairly represented by the polymer chain as depicted above.

Of particular interest are the polymers of the above formula having a molecular weight from about 1000 to about 200,000, especially those of molecular weight from about 20,000 to about 90,000 as determined by gel permeation chromatography. The physical properties of the polymers are determined in part by the molecular weight, whether the polymer is a copolymer or a terpolymer and, in the case of terpolymers, the nature of and the relative proportion of the second hydrocarbon present. Typical melting points for such polymers are from about 175° C. to about 300° C., more often from about 210° C. to about 270° C. The polymers will have a limiting viscosity number (LVN), as measured as dl/g in m-cresol at 60° C., of from about 0.4 to about 10, preferably from about 0.8 to about 4.

The polymers are produced by the general methods of the above published European Patent Applications. Although the scope of the polymerization process is extensive, a preferred catalyst composition is formed from a palladium salt, particularly a palladium alkanoate such as palladium acetate, the anion of trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The reactants are typically contacted in the presence of the catalyst composition under polymerization conditions in an inert reaction diluent. Suitable reaction diluents include lower alkanols such as methanol or ethanol, lower alkyl ketones such as acetone or methyl ethyl ketone, or mixtures thereof. Typical polymerization conditions include a reaction temperature of from about 20° C. to about 150° C., preferably from about 30° C. to about 135° C. The suitable reaction pressures are from about 10 bar to about 200 bar, but reaction pressures of from about 20 bar to about 100 bar are preferred. Subsequent to reaction the polymer is recovered from the polymer-containing suspension by conventional procedures such as filtration or decantation.

The polyketone polymers of the invention are stabilized against undue loss of crystallinity during repeated melting/crystallization cycles by the inclusion therein of a stabilizing quantity of a barium or titanium (IV) acetylacetonate. The role of these particular complexes is apparently unique as other related acetylacetonates are not effective for this purpose. The precise physical nature of the barium acetylacetonate or titanium acetylacetonate is not critical. The complexes are available commercially or are prepared by conventional methods. The barium or titanium acetylacetonate is employed in a stabilizing quantity and quantities from about 25 ppm to about 500 ppm, based on total composition are satisfactory. Preferably the barium or titanium acetylacetonate is employed in a quantity of from about 50 ppm to about 400 ppm on the same basis.

The compositions of the invention are intimate mixtures of the polyketone polymer and the barium or titanium acetylacetonate stabilizer. The method of producing the mixture is not material and conventional methods of producing an intimate mixture of a thermoplastic and a stabilizer are suitably employed. In one modification, the components in a finely divided form are dry-blended and co-melted. Alternatively, a mixture of the components is passed through an extruder to produce the composition as an extrudate. In yet another method the composition is produced in a mixing device such as a mixer or a blender operating at high shear. The stabilized compositions may contain other additives such as colorants, plasticizers, fibers, reinforcements and dyes which were added to the polymer together with or separately from the barium or titanium acetylacetonate.

The resulting compositions will have an improved melt stability as evidenced by a relatively constant apparent crystallinity when subjected to melt processing operations of melting and solidification. This improvement in retained apparent crystallinity offers considerable advantages which are not to be found when unstabilized polymers are utilized. For example, in a typical processing scheme the stabilized composition is converted into nibs by passage through an extruder. The nibs are then often injection molded to produce a shaped article, in each case without substantial decrease in crystallinity as determined by a relatively constant melting point or other related physical property. The compositions of the invention are particularly useful in this and other applications which require a series of melting and solidification cycles. While the compositions of the invention are also usefully processed by conventional techniques which do not involve melting and solidification of the polymer, the advantages of the stabilized compositions are most apparent when melt processing operations which do involve the melting and solidification of the polymer are employed. Thus, the compositions of the invention are useful for a variety of applications as premium thermoplastics as is now known in the art. The compositions are particularly useful for the production of shaped articles typically requiring a number of melt-solidification cycles in their production. Illustrative of such articles are containers for food and drink and parts and housings for automotive applications.

The invention is further illustrated by the following Illustrative Embodiments which should not be construed as limiting.

ILLUSTRATIVE EMBODIMENT I

A copolymer of carbon monoxide and ethylene (56/001) was produced in the presence of a catalyst composition formed from palladium acetate p-toluenesulfonic acid and 1,3-bis(diphenylphosphino)propane. This polymer, termed Polymer A, had a melting point of 257° C. and an LVN, as measured in m-cresol at 60° C., of 2.46 dl/g.

ILLUSTRATIVE EMBODIMENT II

In this Illustrative Embodiment, measurements of melting points and crystallization temperatures, or alternatively heats of melting and heats of fusion, were made by the use of a Perkin-Elmer differential scanning calorimeter (DSC) which employes samples of polymer or polymer compositions in sealed pan containers. The pan and contents are heated at a controlled rate, typically 20° C./minute, until reaching the temperature at which the sample has melted, $T_m1$. The pan and contents are then cooled until the temperature at which the sample has solidified, $T_c1$, is reached and then heated past a second melting point, $T_m2$, to 285° C. at which temperature the sample is maintained for 10 minutes. The pan and contents are then cooled until the sample has solidified a second time, $T_n2$. The melting and crystallization temperatures are defined as the temperatures at which the heat flow reaches a maximum (for melting) or a minimum (for crystallization). Typically the melting point $T_m$ will be higher than the temperature of crystallization $T_c$ and each will decrease somewhat with repeated melting/solidification cycles. Although a number of factors influence the melting point and crystallization temperatures, these values are also influenced by the crystallinity of the polymer. In general, the smaller the difference between the first and second melting points, or the first and second crystallization temperatures, the greater the degree of retained crystallinity.

It is also possible to determine through the use of a DSC the magnitude of the first and second heats of melting ($H_1$ and $H_2$) in cal/g and the first and second heats of crystallization ($C_1$ and $C_2$), also in cal/g, for the polymer and for stabilized compositions. In general, the heats of crystallization will be higher for the stabilized composition than for the unstabilized polymer. The higher the ratio of $C_2/C_1$ is, the greater the degree of retained crystallinity.

Compositions of the terpolymer of Illustrative Embodiment I and various metal acetylacetonates (AcAc) were prepared by employing sufficient 1% solution of the metal AcAc to the terpolymer to give the desired metal proportion, together with 5 ml of ethanol. The components were thoroughly mixed and the solvent removed and the composition dried in a vacuum oven. These compositions as well as the unstabilized polymer, were evaluated by the DSC technique described above. The results are shown in the Table.

TABLE

| Sample | ppm, Metal AcAc | $T_c2$ | $C_2/C_1$ | $H_2/H_1$ |
|---|---|---|---|---|
| Polymer A | 0 | 170 | 0.81 | 1.13 |
| Composition | 289, Ti(AcAc)$_4$ | 182 | 0.77 | 0.71 |
|  | 68, Ba(AcAc)$_2$ | 170 | 0.64 | 0.77 |
|  | 127, Zn(AcAc)$_2$ | 127 | 0.46 | 0.57 |
|  | 97, Fe(AcAc)$_2$ | 0 | 0 | 0 |
|  | 122, Ni(AcAc)$_2$ | 162 | 0.71 | 0.71 |

What is claimed is:

1. A composition stabilized against undue loss of crystallinity when subjected to melting and solidification which comprises:

a linear alternating polymer of carbon monoxide and at least one ethylenically unsaturated hydrocarbon, wherein the polymer is of the repeating formula

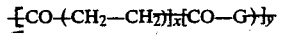

wherein G is a moiety of an ethylenically unsaturated hydrocarbon of at least 3 carbon atoms polmerized through the ethylenic unsaturation and the ratio of y:x is no more than about 0.5; and a stabilizing quantity of barium acetylacetonate or titanium acetylacetonate.

2. The composition of claim 1, wherein the quantity of barium acetylacetonate or titanium acetylacetonate is from about 25 ppm to about 500 ppm, based on total composition.

3. The composition of claim 2 wherein y is O.

4. The composition of claim 2 wherein the ratio of y:x is from about 0.01 to about 0.1.

5. The composition of claim 4 wherein G is a moiety of propylene.

6. The composition of claim 5 containing a stabilizing quantity of barium acetylacetonate.

7. The composition of claim 5 containing a stabilizing quantity of titanium acetylacetonate.

8. A method of stabilizing a linear alternating polymer of carbon monoxide and at least one ethylenically unsaturated hydrocarbon against undue loss of crystallinity when subjected to melting and solidification which comprises incorporating therein a stabilizing quantity of barium acetylacetonate or titanium acetylacetonate, wherein the polymer is represented by the repeating formula

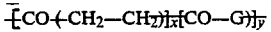

wherein G is the moiety of an ethylenically unsaturated hydrocarbon polymerized through the ethylenic unsaturation and the ratio of y:x is no more than about 0.5.

9. The method of claim 8 wherein the quantity of barium acetylacetonate or titanium acetylacetonate is from about 25 ppm to about 500 ppm, based on total composition.

10. The method of claim 9 wherein y is O.

11. The method of claim 9 wherein the ratio of y:x is from about 0.01 to about 0.1.

12. The method of claim 11 wherein G is a moiety of propylene.

13. The method of claim 12 containing a stabilizing amount of barium acetylacetonate.

14. The method of claim 12 containing a stabilizing amount of titanium acetylacetonate.

* * * * *